(12) United States Patent
Barosso et al.

(10) Patent No.: US 8,614,387 B2
(45) Date of Patent: Dec. 24, 2013

(54) KEYBOARD MUSICAL INSTRUMENT LEARNING AID

(76) Inventors: Luigi Barosso, Kunda Park (AU); Carla Barosso, Kunda Park (AU)

( * ) Notice: Subject to any disclaimer, the term of this patent is extended or adjusted under 35 U.S.C. 154(b) by 50 days.

(21) Appl. No.: 13/508,388

(22) PCT Filed: Dec. 2, 2010

(86) PCT No.: PCT/AU2010/001623
§ 371 (c)(1),
(2), (4) Date: May 7, 2012

(87) PCT Pub. No.: WO2011/066613
PCT Pub. Date: Jun. 9, 2011

(65) Prior Publication Data
US 2012/0227572 A1    Sep. 13, 2012

(30) Foreign Application Priority Data
Dec. 3, 2009  (AU) ................................ 2009905916

(51) Int. Cl.
*G09B 15/08* (2006.01)
(52) U.S. Cl.
USPC ........................................................ 84/478
(58) Field of Classification Search
USPC ........................................................ 84/478
See application file for complete search history.

(56) References Cited

U.S. PATENT DOCUMENTS

| | | | | |
|---|---|---|---|---|
| 3,277,587 A * | 10/1966 | Holcombe | .................... | 434/233 |
| 3,726,176 A | 4/1973 | Kaplan | | |
| 4,762,436 A | 8/1988 | Herzog et al. | | |
| 5,631,861 A * | 5/1997 | Kramer | ............................ | 703/7 |
| 5,912,658 A * | 6/1999 | Bergamasco et al. | .......... | 345/156 |
| 6,042,555 A * | 3/2000 | Kramer et al. | ................. | 600/595 |
| 6,059,506 A * | 5/2000 | Kramer | ................. | 414/5 |
| 6,262,355 B1 * | 7/2001 | Koch | .............................. | 84/600 |
| 6,275,213 B1 * | 8/2001 | Tremblay et al. | ............. | 345/156 |
| 6,979,164 B2 * | 12/2005 | Kramer | ................. | 414/5 |
| 6,982,375 B2 * | 1/2006 | McGregor | ..................... | 84/478 |
| 7,189,909 B2 * | 3/2007 | Vinoly et al. | ................... | 84/453 |
| 7,378,585 B2 * | 5/2008 | McGregor | ..................... | 84/600 |
| 7,390,157 B2 * | 6/2008 | Kramer | ..................... | 414/5 |
| 7,582,825 B2 * | 9/2009 | Chien et al. | ..................... | 84/724 |
| 8,368,641 B2 * | 2/2013 | Tremblay et al. | ............. | 345/156 |
| 2004/0244570 A1 * | 12/2004 | Ando | .............................. | 84/744 |
| 2009/0064849 A1 | 3/2009 | Festejo | | |
| 2012/0167747 A1 * | 7/2012 | Luchinskiy | ................. | 84/485 R |
| 2012/0227572 A1 * | 9/2012 | Barosso et al. | ................. | 84/478 |

* cited by examiner

*Primary Examiner* — Robert W Horn
(74) *Attorney, Agent, or Firm* — David A. Guerra

(57) ABSTRACT

A keyboard musical instrument learning aid having a plurality of keys including: sensing means operatively associated with the keyboard for sensing the presence of an object at a spaced disposition with respect to the keys of the keyboard; positioning means operatively associated with the sensing means for positioning the sensing means such that the spaced disposition is within a predetermined space with respect to the keys; and reporting means operatively associated with the sensing means and operable to report when an object is sensed to be present at the spaced disposition.

12 Claims, 3 Drawing Sheets

KEYBOARD MUSICAL INSTRUMENT LEARNING AID

FIELD OF INVENTION

THIS INVENTION relates to a keyboard musical instrument learning aid. The invention has particular application to a learning aid for novice pupils of the piano. However, the invention is not limited to this field of use.

BACKGROUND ART

Students of piano are required to learn the correct position of the hands, fingers, wrist and forearm as one of the foundation skills in learning to play the piano. Similar foundation skills are a part of learning to play other keyboard musical instruments as well. One of the problems often encountered is that students may allow their wrists to drop too low. Sometimes, this can have a flow-on effect to poor posture and fatigue, and/or wrist or tendon strain. Another problem sometimes encountered is that students may overcompensate for having their wrists too low by raising their wrists to high. This can lead to poor finger control as well as the adverse effects on posture, fatigue and tendon strain.

In this specification, unless the context indicates otherwise, the term "learning aid" is to be taken to refer to a keyboard musical instrument learning aid and such term is to be taken to be synonymous with the term "keyboard musical instrument learning aid".

U.S. Pat. No. 7,714,220 to Sony Computer Entertainment discloses a learning aid for teaching hand placement on a variety of objects, including sporting equipment and such musical instruments as guitars, saxophones, woodwind and brass instruments (the Sony invention). However, the Sony invention is directed to the teaching of accurate placement of the fingers of the hands on the object. Moreover, the instruments towards which the Sony invention is directed are either fretboard, fingerboard or button-key instruments, and is not suited to aid the learning of the correct hand position for playing a keyboard instrument, the correct hand position being essentially the same for all positions of the fingers on the keys; that is, for the position of the fingers on all of the different keys.

The present invention aims to provide a keyboard musical instrument learning aid which alleviates problems associated with teaching and learning of correct hand position for playing keyboard musical instruments. Other aims and advantages of the invention may become apparent from the following description.

DISCLOSURE OF THE INVENTION

With the foregoing in view, the present invention resides broadly in a keyboard musical instrument learning aid having a plurality of keys including:

sensing means operatively associated with the keyboard for sensing the presence of an object at a spaced disposition with respect to the keys of the keyboard;

positioning means operatively associated with the sensing means for positioning the sensing means such that the spaced disposition is within a predetermined space with respect to the keys; and reporting means operatively associated with the sensing means and operable to report when an object is sensed to be present at the spaced disposition.

The sensing means may be mounted to the keyboard. The sensing means may include one or more movement sensors, energy beams or such like having associated energy sensors. For example, the energy beams may be light beams, the or each light beam and its associated sensor being arranged in substantial parallel alignment with the key slip of the keyboard. In such form, the spaded disposition is selected such that the spaced disposition is substantially at the lowest position for the wrists of the player according to a predetermined criterion. It will be appreciated that the predetermined criterion may be subjective, and therefore, the invention is not limited to any particular disposition of the sensing means with respect to the keys. However, the preferred arrangement is for the sensing means to be mounted such that the spaced disposition is at a position below which the hands of the player would be considered as too low for proper playing of the keys.

The reporting means may be operable to report to a person learning the keyboard, or to their teacher, or both. The reporting means may be constituted by an alarm operatively associated with the sensing means and operable to produce an alarm when an object is sensed to be present at the spaced disposition.

In one form, there are two movement sensors, one arranged for sensing when the hands are too low as hereinbefore described, and the other being arranged to sense when the hands are too high. For example, the movement sensors may detect movement by infra red sensing Different alarms may be provided, aural and/or visual, in any desired combination. For example, the alarm alerting the player and/or teacher to the hands being too high may be provided as less intrusive to the player's concentration than the alarm for the hands being too low, it being appreciated that there are occasions in playing keyboards when the hands are lifted wholly from the keyboard to effect particular playing maneuvers.

In another form, the sensing means may be in the form of a bar having a contact face. Accordingly, in another aspect, the present invention resides broadly in a keyboard musical instrument learning aid having a plurality of keys including:

a bar mountable to the keyboard in a spaced disposition from the keys;

a contact face formed on the bar for contact by the hands, wrist and/or wrist region of a player of the keyboard musical instrument; and an alarm operatively associated with the contact face and operable to produce an alarm upon contact of the contact face by a player of the keyboard musical instrument.

Preferably, mounting brackets are provided for mounting to the ends of the keyboard. In such form, the sensing means is mountable to the mounting brackets, the parts being so formed and arranged for mounting the sensing means at the spaced disposition hereinbefore described. More preferably, adjustment means are provided in operative interposition between the sensing means and the mounting brackets for adjusting the position of the sensing means.

When the sensing means is provided as a bar, it is preferred to have a substantially flat upper face, such upper face substantially forming the contact face. The contact face may be convex upward and is provided substantially along the entire length of the bar. The contact face may wrap around the bar. The alarm is preferably formed to include an electro-sensitive film or coating along at least some of the contact face. The alarm may produce an audible or visual alarm activated by making contact with the electro-sensitive film or coating.

In a one form for learning the piano, the bar is spaced from and substantially parallel to the key slip of the piano keyboard, mounted such that the contact face is forward and upward of the key slip and the piano keys. The position of the contact face is selected such that it is below the normal position of the wrist when positioned for striking the white keys of the piano. When provided in the form of a light beam and associated sensor, the disposition of the sensing means is below the normal position of the wrist when positioned for playing the white keys of the piano. Of course, the hand moves over the white keys to strike the black keys such that the relative position of the contact face moves further up the wrist away from the hand. When a second sensing means is provided for sensing when the hands are too high, it is preferred that the disposition of the sensing means is just above the normal position of the wrist when positioned for lifting the fingers from the black keys. Further sensing means may be provided just above or below the normal position of the hands when performing particular maneuvers, such as passing the thumb under the fingers, repositioning the hands, performing trills, mordents or such like.

It will be seen that the present invention may be used to discipline a pupil learning to play a keyboard musical instrument to maintain correct posture and hand position. Accordingly, the present invention, in another aspect, resides broadly in a learning aid to assist a pupil learning to play a keyboard musical instrument including sensing means arranged in operative disposition with respect to the keyboard for sensing the position of the hands or wrists of the pupil and reporting means operatively associated with the sensing means for reporting when the pupil's hands or wrists are outside a predetermined position with respect to the keyboard whereby the pupil may be taught to maintain correct posture and/or hand position for playing the keyboard musical instrument.

BRIEF DESCRIPTION OF THE DRAWINGS

In order that the invention may be more readily understood and put into practical effect, two preferred embodiments of the present invention will now described with reference to the following drawings, and wherein.

DETAILED DESCRIPTION OF THE DRAWINGS

Figure 1:
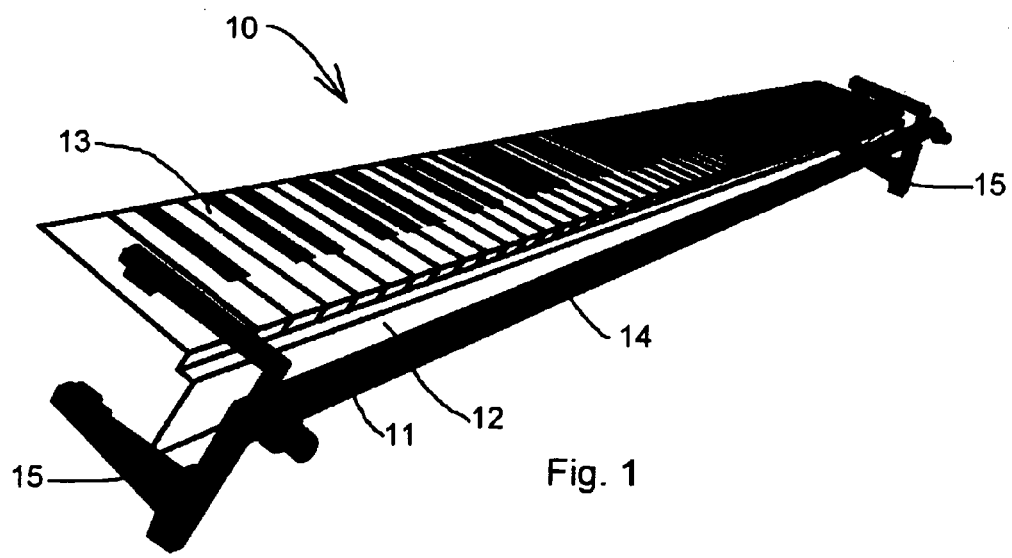
FIG. 1 is a diagrammatic pictorial view of a piano keyboard and learning aid according to the invention.

The learning aid 10 shown in FIG. 1 includes a bar 11 mounted in front of and above a key slip of a piano keyboard 13. The bar is substantially parallel to the key slip 12. A touch-pad 14 extends part-way along a central portion of the bar intermediate its ends. The bar is supported in a selected position by pair of mounting brackets 15, one at or near each end of the bar. The touch pad constitutes at least in part the contact face described herein.

Figure 2:
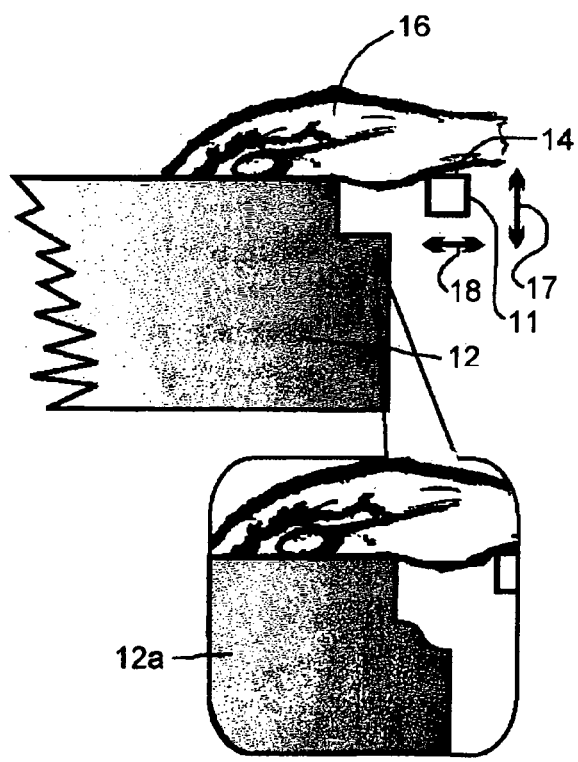
FIG. 2 is a diagrammatic side view of the piano keyboard and learning aid of FIG. 1 showing the positioning of a hand of a player.
Figure 3:
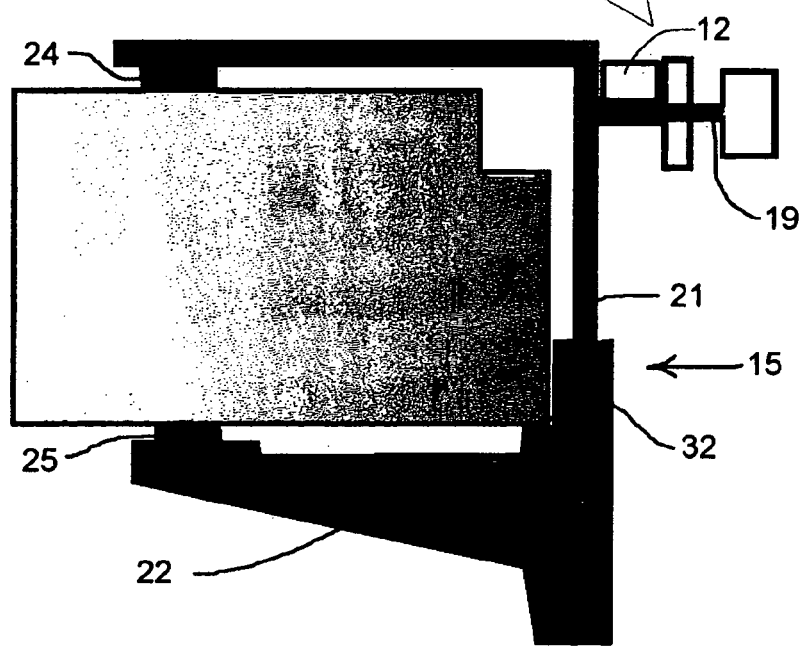
FIG. 3 is a diagrammatic detail view of a mounting bracket for the learning aid of FIG. 1.
Figure 5:
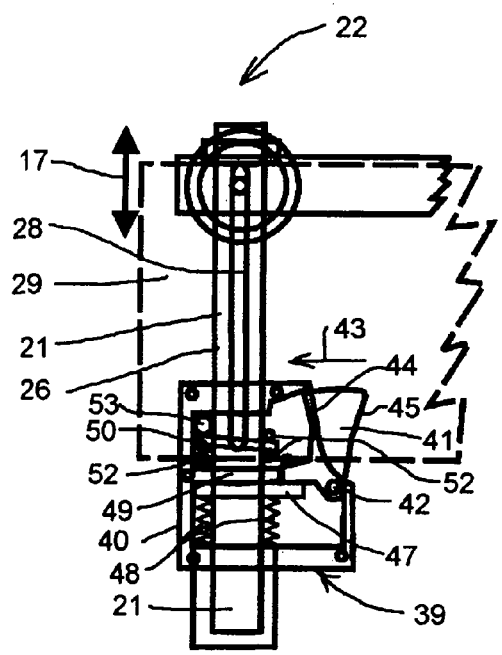
FIG. 5 is a diagrammatic view of an alternative or additional adjustment assembly.

Referring to FIG. 2, the position of the touch pad is adjustable up and down in the directions indicated by vertical arrows 17 and forward and back in the directions indicated by horizontal arrows 18. The preferred position is below the normal position of the wrist of a user's hand 16 when positioned for striking the white keys of the piano. An adjustment assembly 19 holds the bar in position as well as providing fine adjustment Each of the mounting brackets shown in FIG. 3 is each substantially the same. The mounting brackets include an upper angle section 21 and a lower angle section 22, each section being substantially in the form of an angle section to be clamped around each cheek block 29. The angle sections are connected to one another by a clamp assembly 22 shown in more detail in FIG. 5. The relative position of each angle with respect to the other may be coarsely adjusted by releasing and repositioning the angle sections with respect to one another to suit thickness of the cheek block, then re-engaging the clamp to which the mounting brackets are to be mounted. The clamps also include an internal angle for engagement with the lower front corner of the cheek block at 32.

Upper angle section includes an upper protection pad 24 interposed between the upper angle section and the cheek block. The upper protection pad is for protecting the finish on the cheek block. In a similar fashion, the lower angle section includes a lower pad 25 interposed between the lower face of the key bed and the lower angle section. The position of the bar is adjusted with respect to the upper angle section by an adjustment assembly 19.

Figure 4:
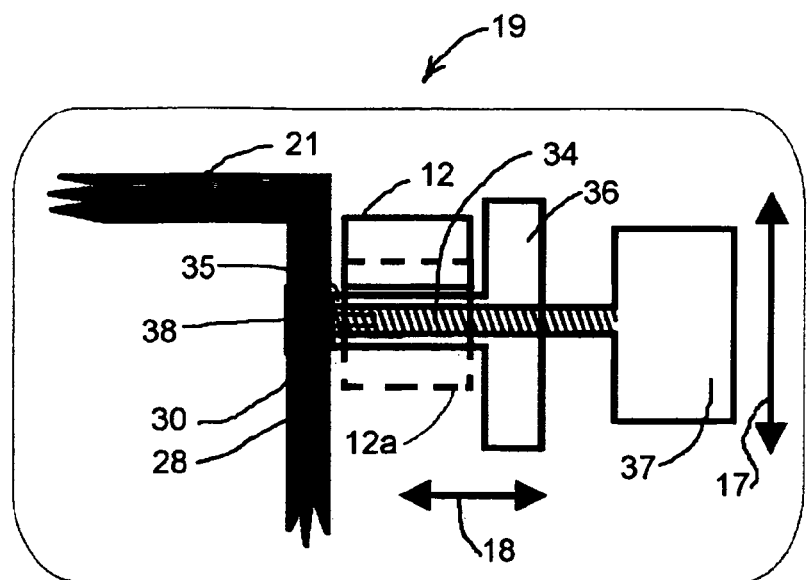
FIG. 4 is a diagrammatic detail view of an adjustment assembly for the mounting bracket of FIG. 3.

The adjustment assembly 19 shown in FIG. 4 includes a set screw 30 having a head which can slide up and down in the direction of arrows 17 along a slot 28 in the upper angle section when the adjustment assembly is not tightened up. The set screw projects outwardly into a threaded rod 34 which may be tightened against the outer face of the upper angle section by turning a fixing knob 37 which is fixed to the end of the threaded rod. The threaded rod passes through a sleeve 35 which also passes through the bar, but is free to rotate with respect to the threaded rod and the rod. The sleeve has an internal thread for threaded engagement with the threaded rod so that the bar may be adjusted in a substantially horizontal direction according to arrows 18 by rotation of an adjustment knob 36 fixed to one end of the threaded rod.

The clamp assembly 39 may be provided for rapid adjustment of the upper and lower clamp sections for mounting to the keyboard. The clamp assembly includes a main body through which a vertical bar 26 of the upper angle section of the clamp 21 passes. The main body is shown with an outer wall nearest the viewer removed to reveal the internal workings thereof. The alternative or additional adjustment assembly is shown the left-hand version facing the front of the piano when mounted thereto, the right hand version being substantially identical but for being a mirror image of that shown.

The main body has a cutaway corner portion 44 in the top corner facing the opposing assembly. A lever 41 is pivotally mounted by way of a lever pivot 42 to the main body for arcuate pivoting movement between a rest position as shown and a crawl position by rotation in the direction of arrow 43 by pressing against an activation face 45. The cutaway corner portion 44 limits the pivoting of the lever since activation face is not readily pressed further to the left than the position of the cutaway corner.

The lever has an engagement portion 46 which engages with a crawl bar 47. The crawl bar has an aperture sized for engagement with the edges of the vertical bar and is retained in its rest position against a crawl stop 49 formed as part of the main body as shown by a pair of crawl springs 48. The crawl springs also serve to retain the lever in its rest position. A ratchet bar 50 is also provided to restrict the movement of the quick adjustment assembly against the direction of the crawl produced by depressing the lever. The ratchet bar is retained for pivoting movement by restraining one end between to retention pillars 51, the other end being moveable downward against a ratchet spring 52 from a ratchet release/stop 53 which limits the upward pivoting of the ratchet bar. The ratchet release/stop is provided in the form of a bar which extends forward of the front face of the main body and may be moved downward to release the ratchet bar whereby the quick adjustment assembly may be moved against the direction produced by activation of the lever.

Figure 6:
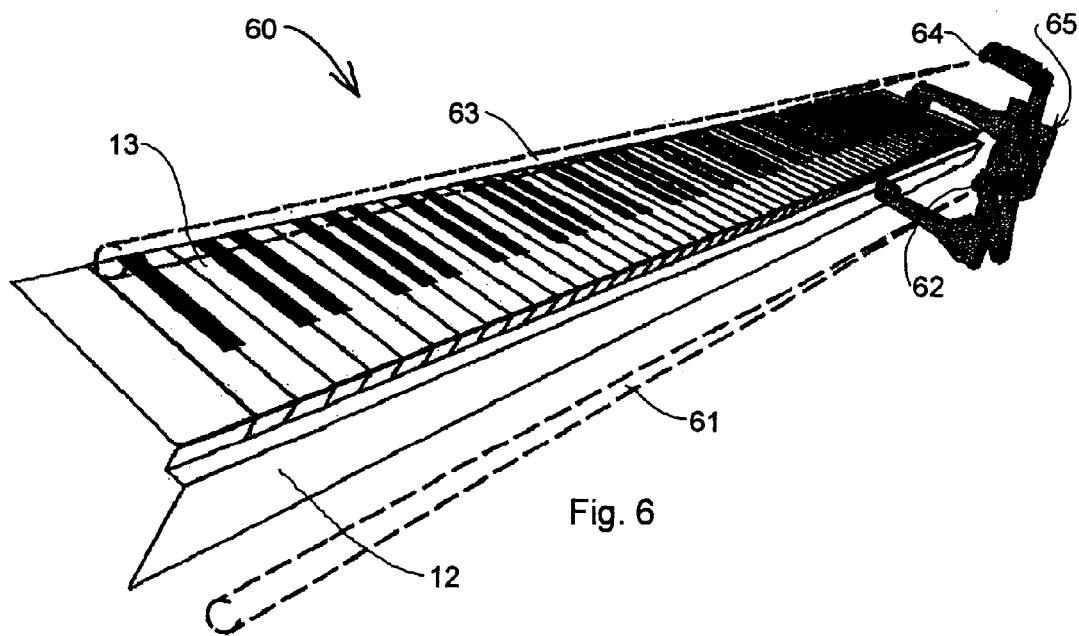
FIG. 6 is a diagrammatic pictorial view of an alternative piano keyboard and learning aid according to the invention.

The alternative learning aid 60 shown in FIG. 6 is the same in many respects as the learning aid 10 shown in FIG. 1, but it the bar is substituted by a sensor field 61 aligned in front of and above the level of the key slip 12 of the piano keyboard 13. The sensor field is substantially parallel to the key slip and of a rod-like configuration by virtue of a collimated arrangement for a sensor 62 supported in a selected position by an alternative mounting bracket 65. A second sensor field 63 is substantially parallel to and spaced above the keys for sensing when the hands or fingers are too high by a second sensor 64. The sensors are shown mounted to the right cheek block, but it will be appreciated that an opposite handed alternative mounting bracket may be provided to mount to the lift cheek block. If desired a camera may also be mounted to the mounting bracket which, in an exemplary form, may be attached to the cheek block by vacuum cups in the manner of a vacuum clamp.

In use, a keyboard musical instrument learning aid may be temporarily attached to a piano or other keyboard musical instrument and adjusted to suit the playing position for the hands of a pupil learning to play the piano or other instrument. Each time the pupil lowers his or her hands too low, contact is made with the contact surface, whereupon the alarm will illuminate to alert the pupil (and his or her teacher). The contact surface is formed from an electro sensitive material that may make or break a low voltage electrical circuit powered, for example, by a dry cell or battery. The electro sensitive material may be electrically insulated from the user or provided as conductors having a zero potential. The power supply, circuitry and speaker for the alarm may be mounted to one of the mounting brackets.

The contact surface is provided along the central portion of the keyboard because that is where the hands are positioned most of the time for playing the keyboard. However, the contact surface may be extended across the whole length of the bar is desired. The learning aid may be removed quickly by releasing the clamp such as for pupils who are more advanced and do not require the learning aid.

Although the invention has been described with reference to a specific example, it will be appreciated that the invention may be embodied in other forms as would be apparent to those skilled in the art within the broad scope and ambit of the invention as herein set forth and defined by the following claims.

The invention claimed is:

1. A keyboard musical instrument learning aid having a plurality of keys including:
   sensing means operatively associated with the a keyboard for sensing the a presence of an object at a spaced disposition with respect to the keys of the keyboard;
   positioning means operatively associated with the sensing means for positioning the sensing means such that the spaced disposition is within a predetermined space with respect to the keys; and
   reporting means operatively associated with the sensing means and operable to report when an the object is sensed to be present at the spaced disposition.

2. The keyboard musical instrument learning aid according to claim 1, wherein the sensing means includes one or more movement sensors.

3. The keyboard musical instrument learning aid according to claim 2, wherein the or each movement sensor is provided in an integral sensing device whereby the positioning mean may be is positioned at one end of the keyboard.

4. The keyboard musical instrument learning aid according to any one of the preceding claims, wherein the sensing means are mounted such that the spaced disposition is at a position below which the hands of the at least one hand of a player would be considered as too low for proper playing of the keys.

5. The keyboard musical instrument learning aid according to any one of the preceding claims claim 1, wherein there are two energy beams and two associated energy sensors, one arranged for sensing when the hands of the are at least one hand of a player is too low for proper playing of the keys, and the other is arranged for sensing when the hands are hand is too high.

6. The keyboard musical instrument learning aid according to any one of the preceding claims claim 1 wherein the sensing means may includes a bar having a contact face.

7. The keyboard musical instrument leaning aid according to claim 6, wherein said bar is mountable to the keyboard in a spaced disposition from the keys and includes a contact face formed on the bar for contact by one of the hands hand, wrist and/or wrist region of the player of the keyboard musical instrument.

8. The keyboard musical instrument learning aid according to claim 6 or claim 7, wherein mounting brackets are provided for mounting to the ends of the keyboard whereby said sensing means is mountable to the mounting brackets, the parts the mounting brackets being so formed and arranged for mounting the sensing means at said spaced disposition.

9. The keyboard musical instrument learning aid according to claim 8, wherein adjustment means are provided in operative interposition between the sensing means and the mounting brackets for adjusting the a position of the sensing means.

10. The keyboard musical instrument learning aid according to claim 9, wherein said bar is mountable at a position spaced from and substantially parallel to the a key slip of the piano keyboard of a piano, mounted such that the contact face is forward and upward of the key slip and the piano keys, the a position of the contact face being selected such that it is below the a normal position of the a wrist of the player when positioned for striking the white keys of the piano.

11. The keyboard musical instrument learning aid according to claim 10, wherein the disposition of the sensing means is below the normal position of the wrist when positioned for playing the white keys of the piano keyboard.

12. The keyboard musical instrument learning aid according to claim 11, wherein second sensing means are provided for sensing when the hands are hand is too high, the disposition of the sensing means being selected to be just above the normal position of the wrist when positioned for lifting the fingers of the player from the black keys of the piano keyboard.

* * * * *